Sept. 20, 1955 P. E. HAWKINSON 2,718,258
JACK ACTUATED TIRE COMPRESSING DEVICE
Filed Dec. 21 1951 2 Sheets-Sheet 1
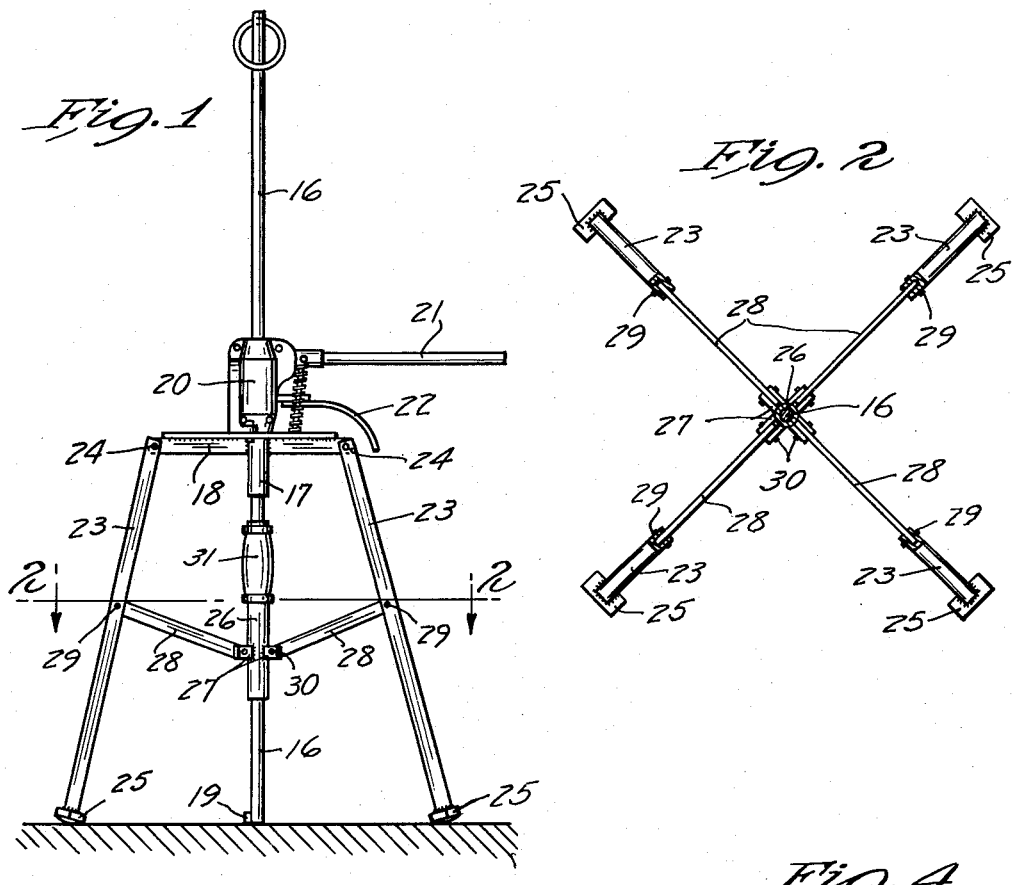
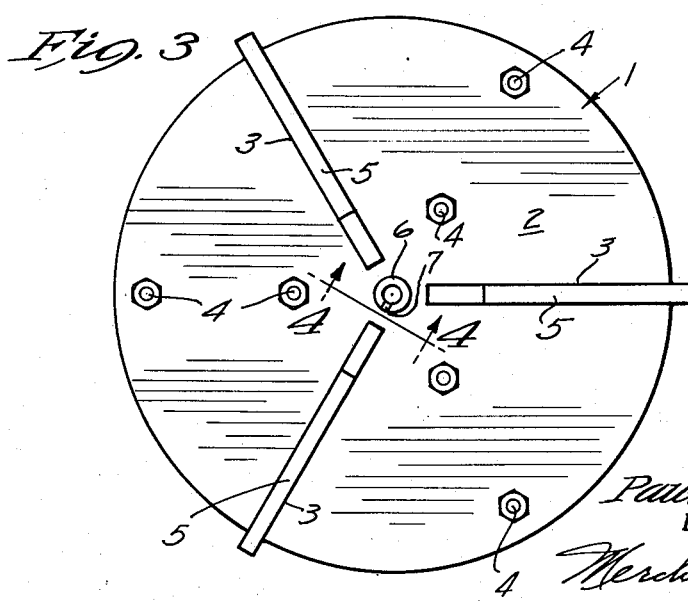
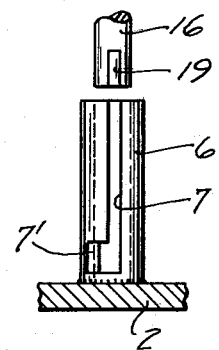
INVENTOR.
Paul E. Hawkinson
BY
Merchant & Merchant
ATTORNEYS

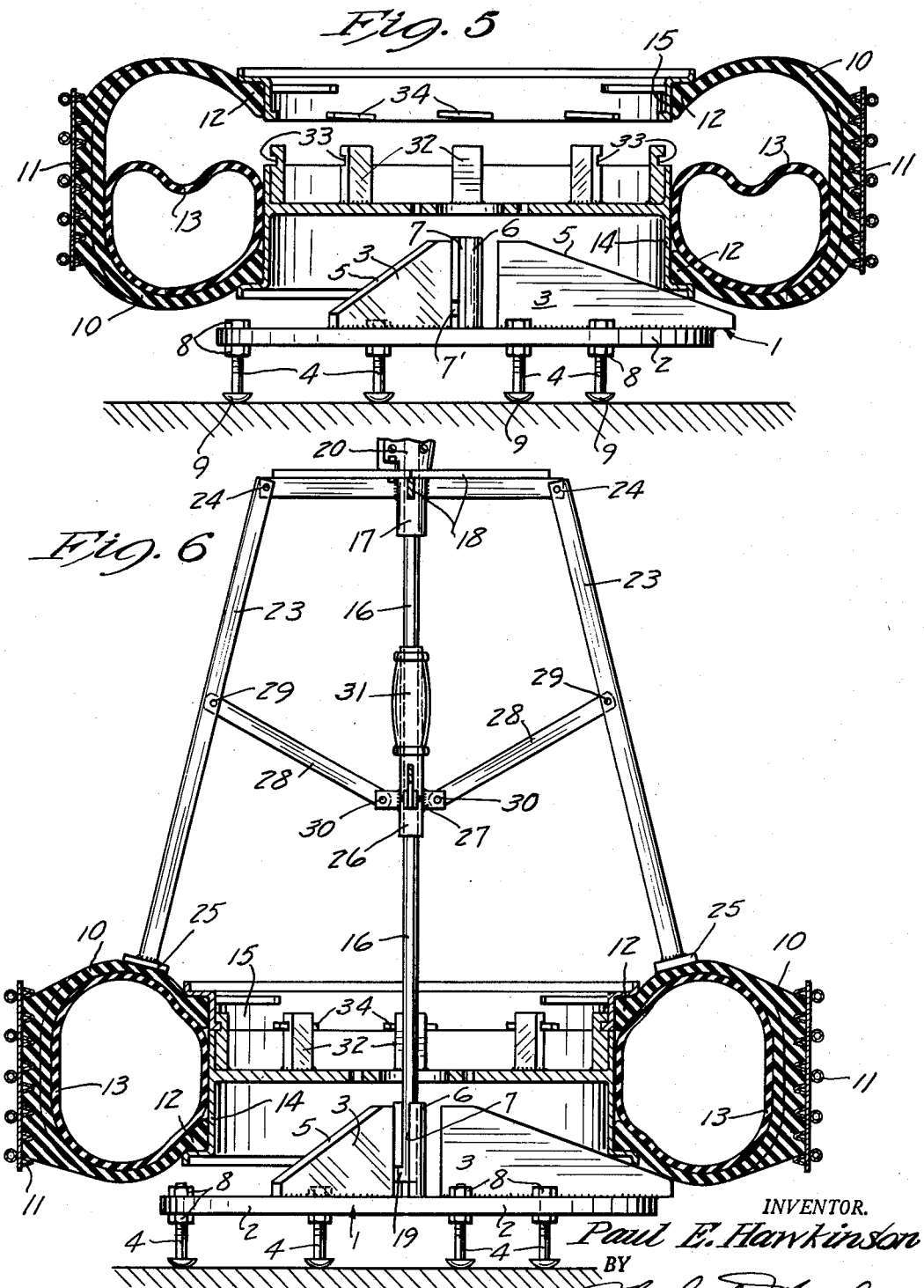

United States Patent Office 2,718,258
Patented Sept. 20, 1955

2,718,258
JACK ACTUATED TIRE COMPRESSING DEVICE

Paul E. Hawkinson, Minneapolis, Minn., assignor to Paul E. Hawkinson Company, Minneapolis, Minn., a corporation of Minnesota Application December 21, 1951, Serial No. 262,730

2 Claims. (Cl. 157—1.2)

My present invention relates generally to pneumatic tire handling equipment and more particularly to a tire tool particularly adapted for use in mounting a pneumatic tire on a rim therefor.

In the retreading of tires in the manner disclosed in my prior United States reissued Patent No. 21,956, the beads of the tire casing are spread apart to effectively reduce the outer diameter thereof so that the tire casing may be inserted into an annular curing ring of the type disclosed in my prior patent above identified. In the case of relatively large head tire casings, after the curing ring has been applied to the reduced outer diameter tire casing, it is often difficult to bring the beads of the tire casing sufficiently close together to fit between the flanges of a rim utilized in connection with the retreading process. An important object of my invention is, therefore, the provision of a tool which can quickly and easily be applied to a tire and whereby the beads of the tire are easily moved toward each other to the desired extent and so that a pair of cooperating rim sections applied to the beads of the tire may be quickly and easily joined together.

Another important object of my invention is the provision of a device, as set forth, which will accommodate tires of various sizes and rim diameters without an appreciable loss of time and effort involved in adjusting the same.

Another object of my invention is the provision of a tire tool, as set forth, which can be produced at low cost, which is highly efficient in operation, and which is rugged in construction and durable in use.

Other highly important objects and advantages of my invention will become apparent from the following detailed specification, appended claims, and attached drawings.

Referring to the drawings which illustrate the invention and in which like characters indicate like parts throughout the several views:

Fig. 1 is a view in side elevation of one of the composite elements of my invention;

Fig. 2 is a horizontal section taken on the line 2—2 of Fig. 1;

Fig. 3 is a top plan view of the tire supporting base of my invention;

Fig. 4 is an enlarged fragmentary view partly in side elevation and partly in section taken on the line 4—4 of Fig. 3 and including a portion of one of the parts of Fig. 1;

Fig. 5 is a view in side elevation of the base of Fig. 3 shown as supporting a rim-equipped pneumatic tire confined in a retreading mold, the mold, tire, and rim therefor being shown in section; and Fig. 6 is a view corresponding to Fig. 5 but illustrating the mechanism of Fig. 1 applied to compress the tire in an axial direction.

Referring with greater detail to the drawings, the numeral 1 indicates in its entirety a base comprising a disc-like base plate 2, a plurality, as shown 3, of circumferentially spaced upstanding members 3 and a plurality of circumferentially spaced depending legs 4. The members 3 extend radially outwardly from the central portion of the base plate 2 and are preferably provided with top rim-engaging surface portions 5 which diverge downwardly in a manner to automatically center an annulus such as a wheel rim placed horizontally thereon. At its center, the base plate 2 is also provided with a vertically extended tubular guide element 6 having therein a bayonet slot 7. The legs 4 are shown as being threaded for vertical adjustment with respect to the base plate 1 and are provided with lock nuts 8 on opposite sides of the base plate 2. At their lower ends, the legs 4 are formed to provide ground or floor-engaging heads 9.

With reference to Figs. 5 and 6, it will be seen that a pneumatic tire casing 10 is shown as being confined in an annular retreading mold 11 of the type clearly disclosed in my prior patent above identified. The diameter of the rim 11 is somewhat smaller than the normal outer diameter of the tire casing so that, in order to apply the rim 11 to the casing 10, the beads 12 of the tire are spread apart to reduce the outer diameter of the casing 10. In the retreading of tires utilizing a mold of the type shown, a band of new tread rubber is adhered to the road-engaging crown of the tire casing after which the casing is placed in the annular mold 11 for curing of the new tread rubber. An inner tube or air bag 13 is placed within the tire casing 10 after which a pair of cooperating rim sections 14 and 15 are applied to the casing and locked together as clearly shown in Fig. 6. Air under pressure is then applied to the air bag 13 and heat induced to the curing ring 11 for a period of time sufficient to properly cure the new tread rubber and make a permanent connection therebetween and the tire casing proper.

In the retreading of tire casings having relatively stiff side walls, when the beads have been spread and casing placed in the annular mold in a diametrically reduced condition, difficulty is experienced in that the beads tend to remain in a spread-apart relationship and extreme force is necessary to move the beads toward each other sufficient to permit locking engagement between the cooperating rim sections 14 and 15. To accomplish this end with a minimum of time and effort involved, I provide a puller rod 16 axially slidably mounted in a bearing boss 17 depending from a transverse resistance head 18, see Figs. 1 and 6. The lower end of the puller rod 16 is provided with a radially outwardly projecting locking lug 19 which, when the lower end of the puller rod 16 is inserted into the guide element, will be contained within the bayonet slot 7 and locked against axial movement when moved into an offset portion 7' of the bayonet slot 7 under partial rotation of the puller rod 16 in one direction. The puller rod 16 extends upwardly through a sleeve 17 projecting downwardly from a resistance head 18 and through a jack 20 equipped with a jack handle 21 and a release lever 22 mounted on the resistance head 18. The jack may be of any suitable type but is preferably of the friction variety. A plurality, as shown 4, of depending legs 23 are pivotally secured at their upper ends to the resistance head 18 at circumferentially spaced points and, as indicated at 24, at their lower ends, the legs 23 are provided with tire wall-engaging feet 25.

Means for adjusting the legs 23 to accommodate tires of different diameters and for maintaining equal spacing between the legs and the puller rod 16 comprises a tubular member 26 axially slidable on the puller rod 16 and formed to provide at its lower end portion a spider 27. A plurality of rigid links 28 are pivotally secured at their outer ends one each to one of the legs 23, as indicated at 29, and at their inner ends to the spider 27, as indicated at 30. The tubular member 26 is provided adjacent its upper end with a hand grip 31 whereby the member 26 may be moved axially with respect to the resistance head 18 for simultaneously swinging the legs 23 toward or away from the puller rod 16.

In use, a tire and curing ring equipped rim section 14 is placed upon the base 1, as indicated in Fig. 5, with the rim sections 14 and 15 in spread-apart relationship. Circumferentially spaced portions of the rim section 14 will engage the downwardly diverging surface portions 5 of the supporting elements 3 whereby, when the rim and tire casing are in a horizontal position, said rim and tire will be concentric with the base plate 1 and the guide element 6 thereon. The lower end of the puller rod 16 is then inserted into the guide element 6 and locked in place by rotating the same until the lug 19 thereof is received within the offset portion 7' of the bayonet slot 7. The tubular member 26 is then manipulated to bring the feet 25 of the legs 23 into engagement with the adjacent side wall of the tire casing 10 immediately radially outwardly of the tire bead engaging flange of the rim section 15. Thereafter, the handle 21 of the jack 20 is manipulated to cause lifting movements to be imparted to the puller rod 16 relative to the resistance head 18 and the legs 23 thereby forcing the legs 23 in a downward direction and positioning the beads 12 of the tire casing 10 sufficiently closely together to permit interlocking engagement between the rim sections 14 and 15. With reference to Figs. 5 and 6, it will be seen that the rim section 14 is provided with circumferentially spaced locking lugs 32 having grooves or channels 33 which are adapted to receive cooperating locking keys or the like 34 formed adjacent the inner edge of the rim section 15. When the keys 34 are laterally offset from but in alignment with the grooves 33, a slight rotation of the rim section 15 will cause the keys 34 to enter the slots 33, as indicated in Fig. 6, thereby locking the rim sections together. The release lever 22 of the jack 20 is then manipulated so as to release the tension on the puller rod 16 after which the lower end thereof is disengaged from the guide element 6 and the entire upper unit removed, after which the tire and rim may be removed for curing of the new tread rubber.

My invention has been thoroughly tested and found to be completely satisfactory for the accomplishment of the objectives set forth; and, while I have shown and described a preferred embodiment of my novel tire tool, it will be understood that the same is capable of modification within the spirit and scope of the invention, as defined in the claims.

What I claim is:

1. A compressing device for rim mounted tires of various sizes comprising in combination a centrally apertured base plate having a plurality of radially extending ribs for supporting tire mounting rim sections in a horizontal position thereon, said ribs having downwardly diverging rim-engaging surface portions operative to center and horizontally support rim sections of varying sizes on said base, a resistance head, a jack mechanism mounted on the top of said resistance head, said resistance head and jack mechanism each having a centrally located opening therein and said resistance head having a plurality of circumferentially spaced legs pivotally secured to the periphery thereof and depending therefrom, said legs being provided with feet at their free ends for engagement with a side wall of tires of various size, a plurality of rigid links pivotally secured intermediate the ends of each leg and pivotally secured at their other end to a grip member having an opening therein in vertical alignment with the openings in said jack and resistance head, a vertically disposed rod longitudinally, slidably mounted in said jack, resistance head and grip openings, the upper end of said rod being lockable in the jack mechanism and its lower end comprising a bayonet means quickly detachably securing the rod to the base member, whereby the grip member and link members cause the feet of the legs to self-adjust radially and axially to engage a side wall of tires of varying sizes and the lifting motion imparted to the rod and base member relative to the head by the jack causes the relative free movement of the head and legs downwardly compressing a tire side wall axially.

2. A compressing device for rim mounted tires and rims of various sizes comprising a centrally apertured base plate having a plurality of radially extending ribs thereon, said ribs having downwardly diverging rim engaging surface portions operative to center and horizontally support rim sections of varying sizes on said base plate, a vertical rod having a lug at one end removably engaged within the central opening in said base plate, a resistance head having a rod clutching jack member mounted thereon, said resistance head and jack member being slidably mounted on said rod between the ends thereof, a plurality of depending legs each pivotally connected at one end to circumferentially spaced points on said resistance head and having a tire engaging foot at its free end, a hand grip slidably mounted on said rod between said head and lug, rigid links pivotally connected at their ends to said hand grip and to intermediate points on said legs respectively and supporting the free ends of said legs in circumferentially spaced radially adjustable positions relative to said rod and base plate, whereby said rod may freely slide vertically through said hand grip, head and jack member when said lug is detached from the base plate and the lug end of said rod and the free ends of said legs are removed from the base plate and rested upon a plane surface.

References Cited in the file of this patent

UNITED STATES PATENTS

| | | |
|---|---|---|
| 2,163,469 | Raschka | June 20, 1939 |
| 2,233,371 | Smith | Feb. 25, 1941 |
| 2,446,963 | Stolz | Aug. 10, 1948 |
| 2,470,107 | Piacenti | May 17, 1949 |
| 2,488,539 | Holbrook | Nov. 22, 1949 |
| 2,508,520 | Johnson | May 23, 1950 |
| 2,512,864 | Koester | June 27, 1950 |
| 2,534,594 | Haecker | Dec. 19, 1950 |
| 2,615,506 | Wilson | Oct. 28, 1952 |